J. F. MEADOWS.
SHEAF CARRIER.
APPLICATION FILED MAY 22, 1916.
1,218,792.
Patented Mar. 13, 1917.
3 SHEETS—SHEET 2.
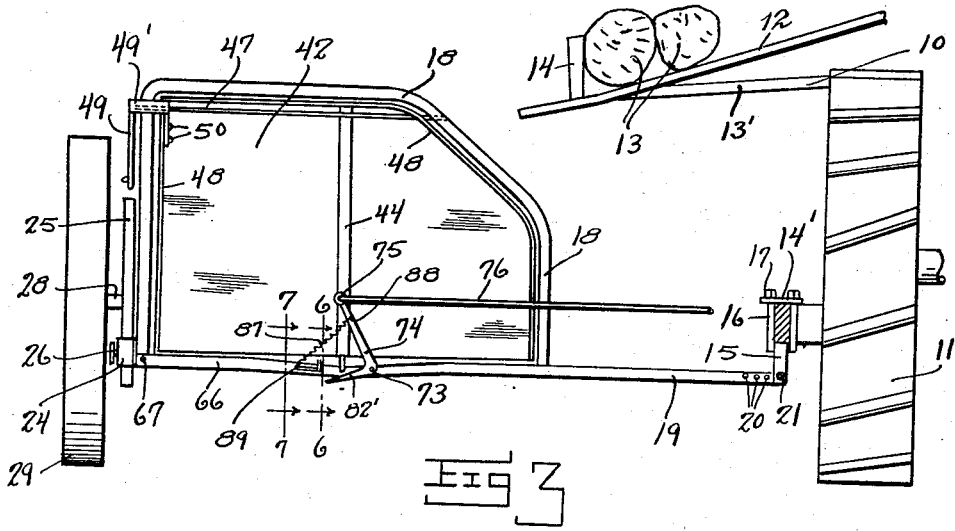
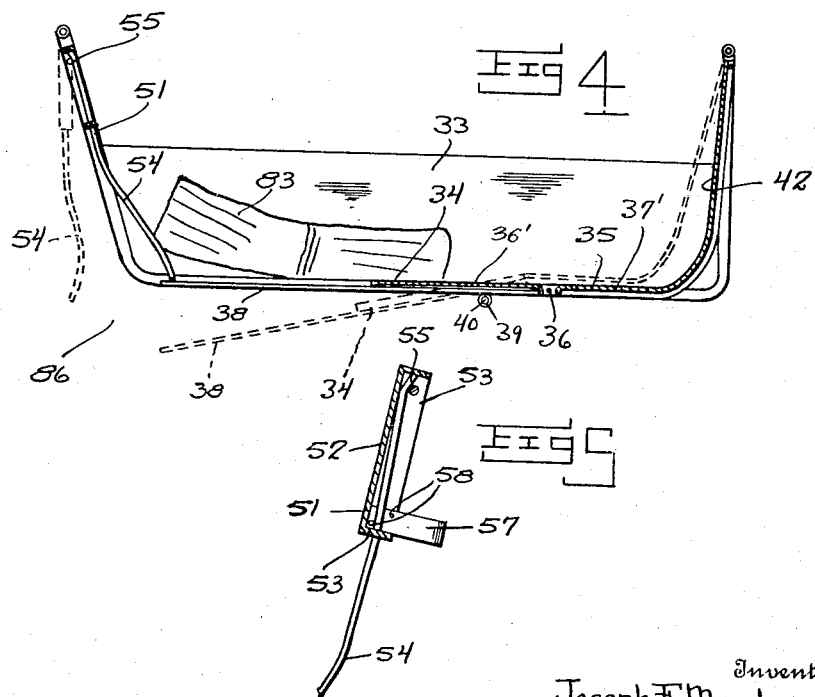
Inventor
Joseph F. Meadows
By H. E. Scantlebury
Attorney J. F. MEADOWS.
SHEAF CARRIER.
APPLICATION FILED MAY 22, 1916.
1,218,792.
Patented Mar. 13, 1917.
3 SHEETS—SHEET 3.
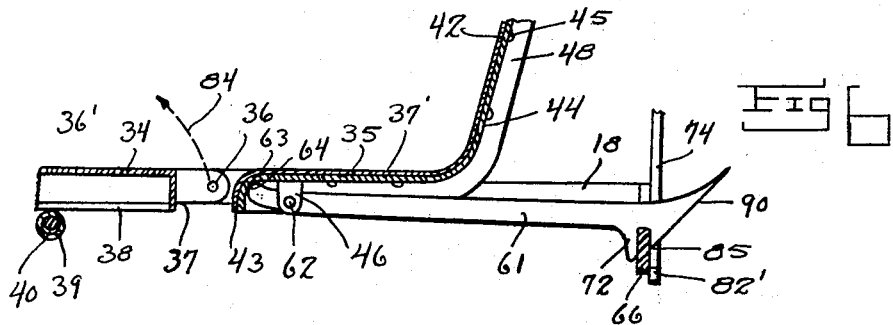
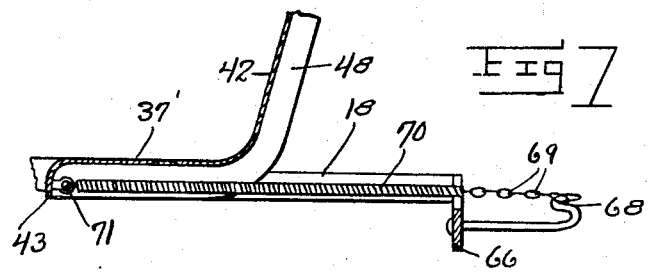
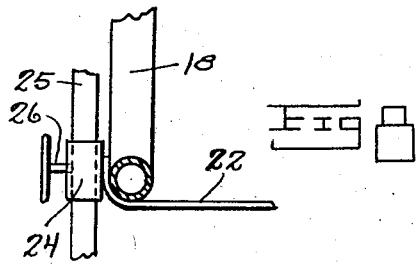
Inventor
Joseph F. Meadows
By H. E. Scantlebury
Attorney

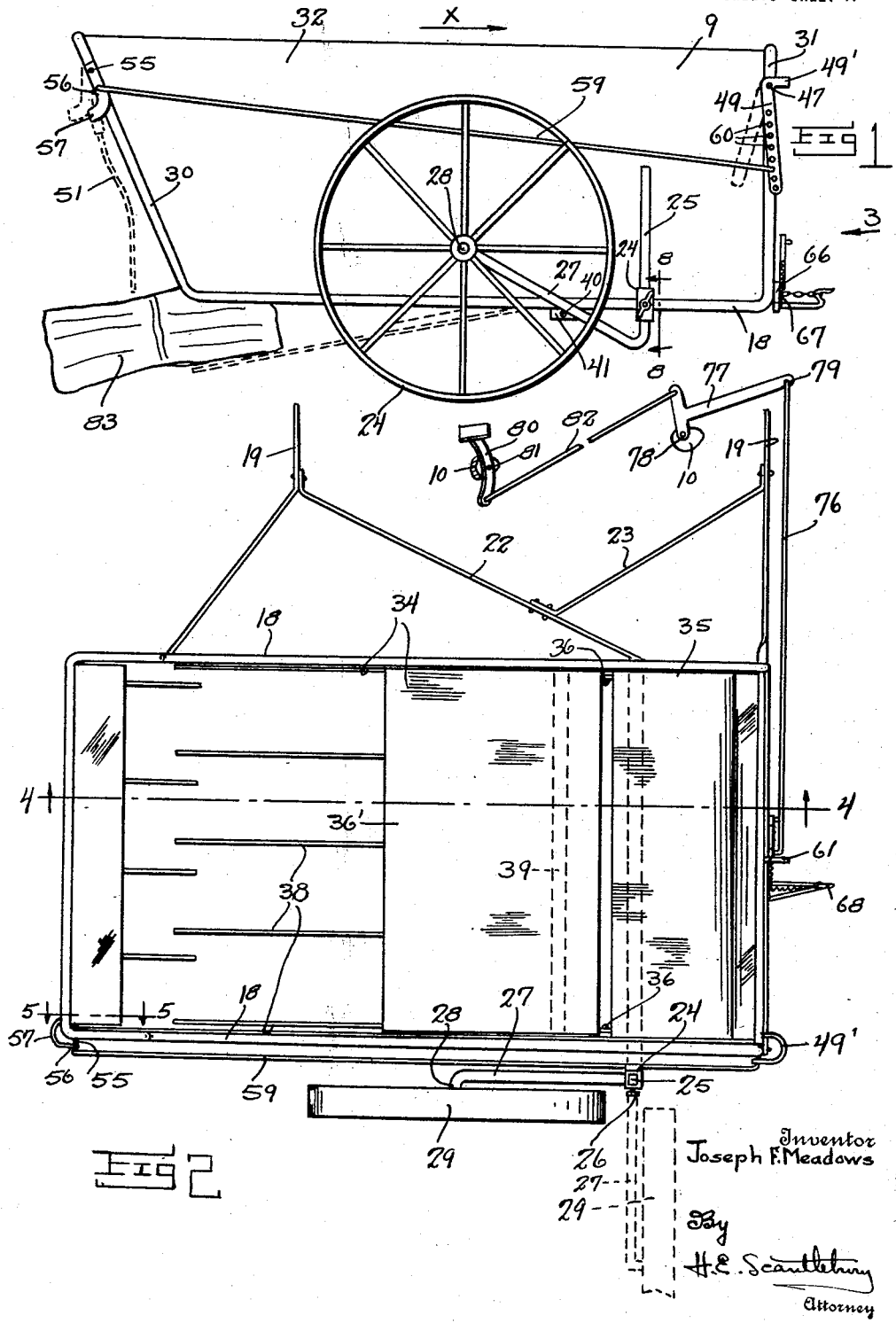

UNITED STATES PATENT OFFICE.

JOSEPH F. MEADOWS, OF ROSALIA, WASHINGTON, ASSIGNOR OF ONE-HALF TO ISRAEL D. LEMLEY.

SHEAF-CARRIER.

1,218,792.  Specification of Letters Patent.  Patented Mar. 13, 1917.

Application filed May 22, 1916. Serial No. 99,147.

*To all whom it may concern:*

Be it known that I, JOSEPH F. MEADOWS, a citizen of the United States, residing at Rosalie, in the county of Whitman and State of Washington, have invented a new and useful Improvement in Sheaf-Carriers, of which the following is a specification.

My invention relates to improvements in sheaf carriers for harvester binders and has for one of its objects to provide a carrier which will prevent the sheaves from rolling therefrom under any and all conditions of the ground over which the carrier is traveling.

Another object is to provide a carrier which shall be so constructed that the major portion thereof is sheet metal or similar material in order to prevent the sheaves from catching in the carrier when dumping as is the case when rods only constitute the body of the carrier.

Another object is to pivotally hang the carrier to the frame of the binder and provide a supporting wheel to give the carrier freedom of movement when the bull wheel of the harvester dips into furrows.

Another object is to provide a supporting wheel which will even up the side draft of the harvester which is caused by the weight of the grain carried on the harvester elevator.

Another object is to provide a supporting wheel which is so mounted that it may be adjusted to allow the carrier to effectively operate and retain the sheaves on hill sides.

A further object is to provide a carrier which may be easily detached from the harvester when cutting the first rounds of the field.

A further object is to provide a supporting wheel which may readily be converted into a trailer wheel.

A further object is to so construct the carrier that it is locked in a sheaf retaining position until the operator wishes to dump the sheaves.

A still further object is to provide a carrier which may be easily thrown into dumping position and which automatically relocks itself after the sheaves are dumped.

Still further objects will be more fully described and pointed out in and by the appended specification and claims.

In the drawings:—

Figure 1 is a side elevation of my improved carrier.

Fig. 2 is a plan view thereof.

Fig. 3 is a view looking in the direction of arrow 3 of Fig. 1.

Fig. 4 is a section on line 4—4 of Fig. 2.

Fig. 5 is a section on line 5—5 of Fig. 2.

Fig. 6 is an enlarged section on line 6—6 of Fig. 3.

Fig. 7 is an enlarged section on line 7—7 of Fig. 3.

Fig. 8 is an enlarged section on line 8—8 of Fig. 1.

Like numerals refer to the same parts throughout the various figures of the drawings.

At 10 I have indicated a portion of any standard harvester binder, 11 representing the bull wheel thereof and 12 the bundle or sheave chute. The sheaves 13 are held on the chute 12 by the usual stop 14 which may be lowered to allow sheaves 12 to drop into the carrier 9 by any suitable means such as rod 13'.

A portion of the frame work of binder 10 is indicated at 14' and a U-shaped strap 15 is secured thereto by U-bolts and straps 16 and 17, respectively.

The frame work of my bundle carrier is generally indicated with 18 and extensions 19 thereof are provided at apertures 20 through which bolts, carried by straps 15, pass. Straps 15 and bolts 21 provide a pivotal hanging for the frame work 18 so that the carrier 9 as a whole may accommodate itself to unevenness of ground.

Braces 22 and 23 serve to strengthen the extensions 19. Brace 22 extends beneath the frame work 18 and, as shown in Fig. 8, serves as a support for the sleeve 24. A rod 25 preferably constructed of polygonal cross section is slidably mounted in sleeve 24 and a set screw 26 will retain rod 25 within sleeve 24 in a predetermined position. An extension of rod 25 is indicated at 27 and extension 27 is integral with or carries axle 28 upon which supporting wheel 29 is rotatably mounted. It will be seen that should the carrier 9 fall on the lower level of a hill side with respect to the binder 10, the set screw 26 may be loosened and the rod 25 thrust down until the carrier 9 is level, the pivotal connection of bolts 21, and straps 15 allowing this movement.

It will be understood that the carrier 9 is drawn in the direction of arrow X of Fig. 1 when in operation.

In using some styles of binders the carrier will be trailed behind the binder onto and off of the field before and after binding, respectively. In connection with such styles of binder the carrier 9 would be trailed in a direction at right angles to the direction of arrow X and in such a case the rod 25 would be entirely withdrawn from sleeve 24 and re-inserted so as to position the wheel 29 as shown in dotted lines in Fig. 2.

The frame work 18 extends upwardly at 30 and 31 to form wall supports. Stationary side walls, preferably constructed of sheet metal or other smooth material, are shown at 32 and 33.

The bottom of the carrier 9 consists of the major portion 34 and the minor portion 35 which are pivotally secured to each other at 36. The member or portion 34 may consist of the sheet metal plate 36', to the flanges 37 of which are attached the rods 38. Rods 38 rest on the roller 39 which is loosely sleeved over the rod 40 which is secured at 41 to the frame 18. Roller 39 is preferably mounted so that a major portion of the member 34 extends to the rear thereof with respect to the direction of travel of carrier 9. The minor portion of the bottom or member 35 consists of the sheet metal plate 37' which is bent upwardly to form the front end 42 and is flanged downwardly as at 43. A brace 44 is shown secured to plates 37 at 45 and the brace 44 carries the apertured lug 46.

End 42 is pivotally mounted on the rod 47 through flanges 48, rod 47 being mounted in the frame work 18.

A crank 49 swings loosely on rod 47 and is bent around the upright portion of frame 18 as at 49' and is secured to flange 48 as at 50. The rear sheaf retaining wall is indicated at 51 and preferably consists partially of the plate 52 which is flanged as at 53. The remainder of the wall 51 consists of the fork or rod members 54 which, when in a sheaf retaining position, preferably slightly overlap the ends of rods 38 as shown in Figs. 2 and 4. Wall 51 is pivotally mounted to frame 18 on rod 55 upon which crank 56 is also pivotally mounted. Crank 56 is bent around the frame 18 as at 57 and is fastened to flange 53 at 58. A rod or link 59 is adapted to connect cranks 49 and 56. Crank 49 is provided with a series of apertures 60 so that by inserting and securing one end of rod 59 in different apertures 60, the throw of crank 56 and hence the distance end 51 swings when dumping, may be changed.

I will now describe my means for locking the various members of the carrier 9 in a sheaf retaining position. A hook member 61 is pivoted to lug 46 at 62, one end 63 being adapted to abut against brace 44 at 64. The notch 65 is adapted to hook over bar 66 which is fastened to frame 18 at 67.

Extending from bar 66 is the hook 68 over which a chain 69 is hooked. A spring 70 is fastened at one end to flange 43 as at 71 and at the other end to chain 69. It will be seen that by stretching spring 70 so that different links of the chain 69 may be caught over hook 68, that the tension of spring 70 may be regulated. A stop 72 on hook member 61 limits the forward thrust of hook member 61, which thrust is imparted through the tension of spring 70.

Pivoted to bar 66 at 73 is the bell crank 74, to the extremity 75 of which is attached an operating rod or cable 76. Rod 76 may be extended to be operated by the driver of the binder 10 in any suitable manner but in Fig. 2 I have shown a conventional method. This method consists of providing the bell crank 77 which is pivoted to the binder 10 at 78 and attached at 79 to rod 76. A foot pedal 80 is pivoted to binder 10 at 81 and a rod 82 connects pedal 80 and bell crank 77.

Suppose that sheaves such as 83 had dropped from chute 13 into the carrier 9 as shown in Fig. 4. Due to the off center relation of the bottom 34 to the roller 39, the weight of sheaves 83 would tend to swing bottom 34 in the direction of arrow 84 of Fig. 6. This tendency would draw bottom 35 and hence hook member 61 toward the left in the same figure, but such an action would only cause point 85 to press more firmly against bar 66 and thus prevent any movement of the bottom members 34 and 35.

When the operator desires to dump the bundles 83, pressure is exerted upon pedal 80, causing it to swing in a clockwise direction. Through the medium of rod 82, bell crank 77 and rod 76, the bell crank 74 is then swung in a clockwise direction causing the arm 82' thereof to strike the point 85 and swing the hook member 61 in a counter-clockwise direction, thus releasing notch 65 from bar 66. The weight of the bundles 83 then causes bottom members 34 and 35 to assume the position shown in dotted lines in Figs. 1 and 4, member 34 not only dropping down at its free extremity but sliding to the rear over roller 39 due to the weight of the bundles 83. As member 34 slides in this direction it will be seen that member 35 and end plate 42 swing in a clockwise direction which movement, through the medium of crank 49, rod 59, and crank 56 causes the wall 52 and rod 54 to swing into the position shown in the dotted lines in Figs. 1 and 4, leaving a space 86 through which the sheaves 83 may slide. As the carrier 9 advances, the sheaves 83 slide clear from the bottom 34 and drop to the ground.

When the operator releases his foot from the pedal 80, spring 87 which is fastened to bell crank 74 at 88 and to the shank of hook 68 at 89, returns bell crank 74 to the position of Fig. 3.

As soon as the sheaves have dropped from the bottom 34, spring 70 draws bottom member 35 and hence member 34 back into the full line position of the various figures and the inclined plane 90 of hook member 61 rides up over bar 66 and allows notch 65 to once more lock over bar 66, thereby returning the carrier 9 to a sheaf retaining position.

While I have herein shown and described one specific embodiment of my invention I do not wish to be limited thereto except for such limitations as the claims may import.

What I claim is:—

1. In a sheaf carrier, in combination, a frame, a roller on the frame, a bottom slidable on said roller, a minor bottom member pivoted to the bottom, a member on the frame, a latch carried by the bottom and normally engaging the member to prevent sliding of the bottom, means to disengage the latch from the member to permit the bottom to slide, and a spring to return the bottom to a normal position and cause the latch to become engaged with the member.

2. In a sheaf carrier, in combination, a frame, a roller on the frame, a bottom slidable on said roller, a minor bottom member pivoted to the bottom, a member on the frame, a latch carried by the bottom and normally engaging the member, a bell crank having one of its arms arranged adjacent the latch so as to disengage the same from the member when the crank is rocked, means to rock the crank, and a spring connecting the bottom with the frame, for the purpose set forth.

3. In a sheaf carrier, in combination, a frame, a roller on the frame, a bottom slidable on the roller, a minor bottom member pivoted to the bottom, a bar fixed to the frame, a latch pivoted to the bottom and having a notch for engagement with the bar, the latch, adjacent the notch, having an inclined face, a bell crank having one of its arms arranged adjacent the inclined face of the latch so as to disengage the notch from the bar when the crank is rocked, means to rock the crank, and a coil spring connecting the bottom to the frame.

In testimony whereof, I hereby affix my signature in the presence of two witnesses.

JOSEPH F. MEADOWS.

Witnesses:
W. W. BRAND,
J. G. WIDNER.

Copies of this patent may be obtained for five cents each, by addressing the "Commissioner of Patents, Washington, D. C."